United States Patent [19]

Fischer et al.

[11] Patent Number: 5,076,746
[45] Date of Patent: Dec. 31, 1991

[54] FIXING ELEMENT FOR ANCHORING IN A HOLE DRILLED IN A CONCRETE PART

[75] Inventors: Artur Fischer, Tumlingen; Wilfried Weber, Schopfloch-Unteriflingen, both of Fed. Rep. of Germany

[73] Assignee: fischerwerke Artur Fischer GmbH & Co KG, Tumlingen, Fed. Rep. of Germany

[21] Appl. No.: 696,097

[22] Filed: May 6, 1991

[30] Foreign Application Priority Data

May 7, 1990 [DE] Fed. Rep. of Germany ....... 4014522

[51] Int. Cl.[5] .............................................. F16B 13/06
[52] U.S. Cl. ...................................... 411/55; 411/44; 411/57
[58] Field of Search .................... 411/43, 44, 34, 35, 411/36, 37, 38, 55, 60, 70, 71, 15, 72, 57, 63, 64

[56] References Cited

FOREIGN PATENT DOCUMENTS 857141 11/1952 Fed. Rep. of Germany ........ 411/71
1339319 9/1987 U.S.S.R. ................................. 411/15

Primary Examiner—Rodney M. Lindsey
Attorney, Agent, or Firm—Michael J. Striker

[57] ABSTRACT

The fixing element for anchoring in a hole drilled in a concrete part includes a threaded bolt, an expansible body with an expander cone and an expansible sleeve having an internal bore. The expansible sleeve has longitudinal slots extending from its front end and the expansible body is joined to the threaded bolt for expansion in the drilled hole. To ensure that the fixing element can continue to at least partially hold after experiencing a sever excessive stress such as occurs during an earthquake, the internal bore (14) of the expansible sleeve (11) has a first cylindrical portion (14a) in its front end, which has a length corresponding approximately to the length of the expander cone (5) and the diameter of the first cylindrical portion (14a) corresponds to the smallest expander cone diameter. The internal bore (14) also has a second, conically widening portion (14b) connected to the first cylindrical portion and a third cylindrical portion (14c) which extends from and is connected to the second conically widening portion. The third cylindrical portion (14c) has a diameter which corresponds to the largest diameter of the second conically widening portion. The longitudinal slots (12) terminate in the conically widening portion (14b) of the internal bore (14).

5 Claims, 2 Drawing Sheets

FIXING ELEMENT FOR ANCHORING IN A HOLE DRILLED IN A CONCRETE PART

BACKGROUND OF THE INVENTION

The invention relates to a fixing element for anchoring in a hole drilled in a concrete part.

A known fixing element has an expansible body joined to a threaded bolt and with an expander cone, and also an expansible sleeve having several longitudinal slots extending from a front end of the sleeve over a portion of the length of the sleeve.

The longitudinal slots enable the expansible sleeve to expand as the expansible body is drawn into it. At its other end, the fixing element can be constructed as a threaded bolt, to which an article can be fastened by a nut. When the nut is screwed on, the expansible body joined to the threaded bolt is drawn into the expansible sleeve. The expansible sleeve braced against the article being fastened is thus expanded and consequently the fixing element is anchored in the drilled hole.

If a fixing element inserted in a drilled hole and anchored in this manner is subjected to a momentary excessive stress or shock, such as may occur as a result of violent vibrations or an earthquake, there is a danger that the resulting tremendous jolts cannot be absorbed by the fixing element and this will break out of the drilled hole, or the bolt will break away.

SUMMARY OF THE INVENTION

It is an object of the present invention to provide a fixing element capable of absorbing sudden load changes and to prevent the breaking up of the drilled hole or bolt breaking.

According to the present invention, the expansible sleeve has an internal bore including a first front cylindrical portion whose length corresponds approximately to the length of the expander cone of the expansible body and having a diameter corresponding to the smallest diameter of the expander cone, and a second, conically widening portion which is connected to the first cylindrical portion and widens from that first portion and a third cylindrical portion which has a diameter corresponding to the largest diameter of the second conically widening portion. The longitudinal slots in the expansible sleeve extend from a sleeve front end into the second conically widening portion of the internal bore.

When anchoring the fixing element according to the invention, the expansible body is drawn into the first portion of the internal bore of the expansible sleeve. Because the diameter of this first portion corresponds to the smallest diameter of the expander cone, there is maximum possible wall thickness available for the anchoring. Because of that, high holding values are attained with normal static loading of the fixing element.

When the fixing element is subjected to shocks as a result of an earthquake, stresses that exceed the normal holding value of a fixing element may occur momentarily. Because of the second widening portion of the internal bore of the expansible sleeve adjoining the first portion, the expander body is drawn by the momentary excessive stress into the second widening portion of the internal bore. As this happens, some of the additional expansion pressure in the drilled hole resulting from the excessive stress is reduced, and thus the stress on the bolt and the concrete is diminished. This ductile behavior of the fixing element prevents the drilled hole from breaking up or the bolt breaking away as a result of the momentary excessive stress. The conically widening second portion of the internal bore of the sleeve provides progressive relief depending on the axial displacement of the expander body in the expansible sleeve. After being subjected to such shock, it is, of course, necessary to exchange the fixing element.

An optimum ductile behavior of the fixing element is achieved, if the second conically widening portion of the internal bore of the expansible sleeve has a length equal to a value between the length of the first cylindrical portion to twice the length of the first portion, and advantageously is 1½ times the length of the first portion. Also a diameter of the second conically widening portion of the internal bore should correspond approximately to the mean diameter of the expander cone of the expansible body.

To achieve a good engagement of the fixing bolt in the fixing plug sleeve, especially to accommodate transverse forces, it is expedient for the fixing bolt, adjoining the expansible body, to have a constriction shaped to fit the contour of the internal bore of the expansible sleeve.

If the fixing element is anchored in a drilled hole with an undercut, the largest diameter of the expander cone of the expansible body should approximately correspond to the external diameter of the expansible sleeve. This ensures that, after the anchoring, the expansible segments of the expansible sleeve bent into the undercut will completely fill the undercut.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
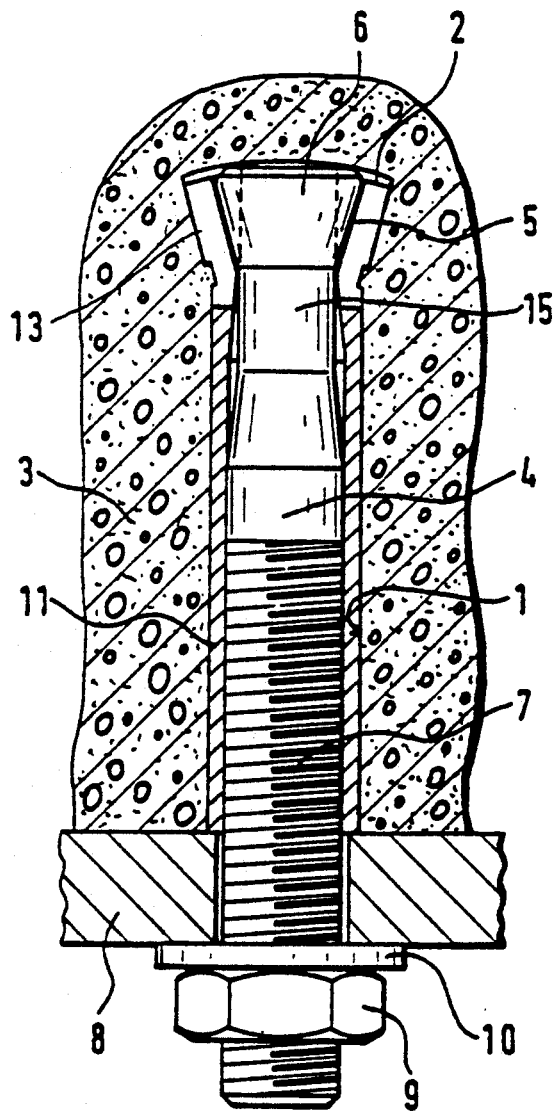
FIG. 1 is a cross-sectional view through a fixing element according to the invention anchored in a drilled hole with an undercut.

The fixing element illustrated in FIG. 1 is anchored in a hole 1 with an undercut 2 drilled in a concrete part 3. The fixing element consists of a threaded bolt 4 and an expansible body 6 provided with an expander cone 5. The expansible body 6 with the expander cone 5 is screwed on the front end of the threaded bolt 4. The opposite end of the threaded bolt has a threaded portion on which the article 8 to be fixed is placed and secured to the concrete part 3 by a nut 9 and washer 10. To effect the anchoring, an expansible sleeve 11 is driven by a driving-in-tool (not illustrated) onto the expander cone 6 resting at the bottom of the drilled hole. As the sleeve 11 is driven on, the expansible segments 13 of the expansible sleeve 11 formed by longitudinal slots 12 are bent into the undercut 2.

Figure 3:
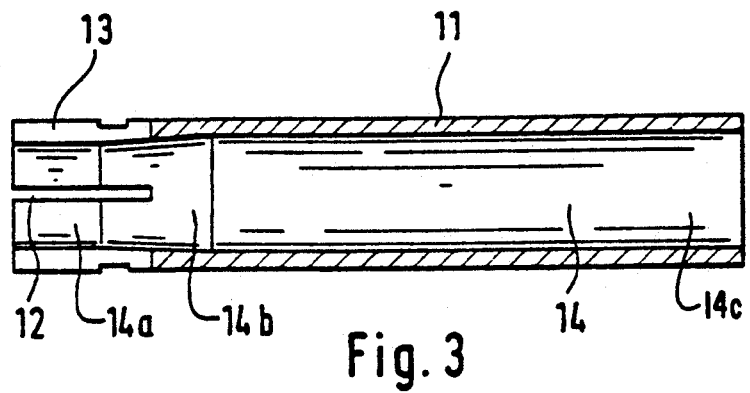
FIG. 3 is a cross-sectional view through an expansible sleeve of the fixing element.

FIG. 3 illustrates the expansible sleeve 11 in its unexpanded state without the threaded bolt 4. A first cylindrical portion 14a of the internal bore 14 has a diameter that corresponds to the smallest diameter of the expander cone 5 and a length corresponding approximately to the length of the expander cone. To form the expansible segments 13, the sleeve 11 is provided with the longitudinal slots 12. Each longitudinal slot 12 extends from the front end face of the sleeve 11 to approximately the middle of a second conically widening portion 14b of the internal bore, which is connected to the first cylindrical portion 14a. The internal bore of the sleeve 11 then continues from the conically widening portion 14b in a third cylindrical portion 14c whose diameter is approximately equal to the largest diameter of the second conically widening portion 14b. Adjoining the expansible body, the threaded bolt 4 is provided with a constriction 15 to match the internal contour of the expansible sleeve 11, the diameter of which constriction corresponds to the internal diameter of the first portion 14a of the internal bore 14 of the sleeve 11.

Figure 2:
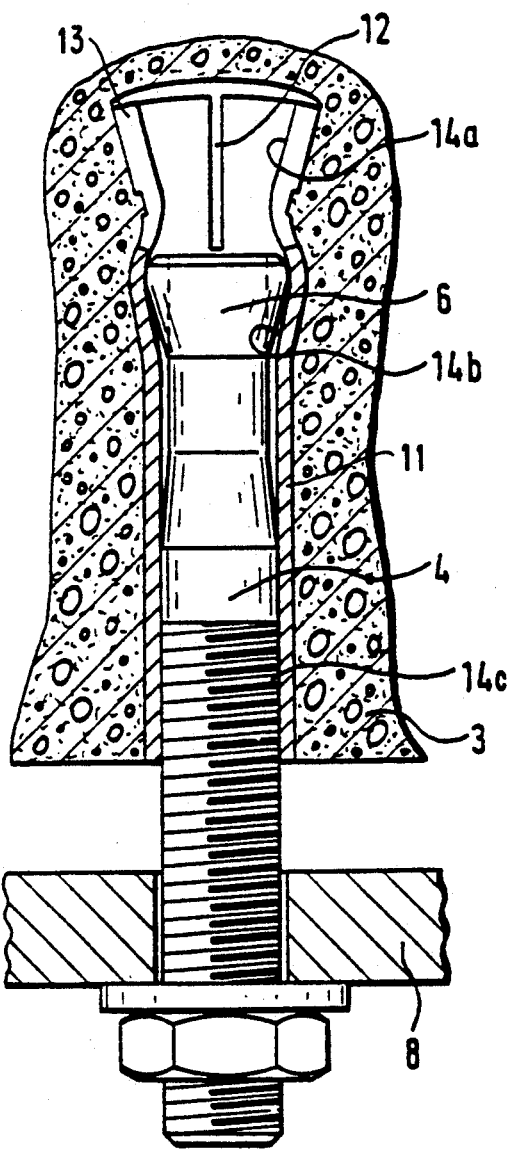
FIG. 2 is a cross-sectional view through the fixing element of FIG. 1 shown after experiencing a shock.

FIG. 2 shows the axial displacement of the threaded bolt 4 after being subjected to a shock, for example caused by an earth quake. The expansible body 6 is drawn by the momentary excessive stress into the second conically widening portion 14b, and the resulting energy is dissipated as its is drawn into that portion. Since the diameter of the conically widening portion 14b corresponds approximately to the mean diameter of the expander cone 5 of the expansible body 6, however, even in this position there is still adequate holding power to hold fast the fixed article 8. The article is, however, no longer clamped to the surface of the concrete part 3, and the fixing element has suffered sufficient damage to necessitate its being exchanged for refixing of the article 8. Using the fixing element according to the invention, however, during and after excessive stress the fixed article remains secured. The fixing element is therefore especially suitable for use in regions at risk from earthquakes.

The external diameter of the expansible sleeve and the diameters of the internal bore and the various portions of the internal bore of the expansible sleeve are taken to be those diameters of the expansible sleeve in the unexpanded or undeformed state of the expansible sleeve.

It will be understood that each of the elements described above, or two or more together, may also find a useful application in other types of constructions differing from the types described above.

While the invention has been illustrated and described as embodied in a fixing element for anchoring in a hole drilled in a concrete part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a fixing element for anchoring in a hole drilled in a concrete part, said fixing element including a threaded bolt, an expansible body with an expander cone and an expansible sleeve having a front end and provided with an internal bore, the expansible sleeve being provided with a plurality of longitudinal slots extending from the front end through a portion of the expansible sleeve, the expansible body being joined to the threaded bolt, the expander cone having an expander cone length, a largest expander cone diameter, a mean expander cone diameter and a smallest expander cone diameter, the expansible sleeve having an outer diameter, the improvement wherein the internal bore (14) of the expansible sleeve (11) has a first cylindrical portion (14a) located in the vicinity of the front end of the expansible sleeve (11) and having a length corresponding approximately to the expander cone length, a diameter of the first cylindrical portion (14a) of the internal bore (14) corresponding to the smallest expander cone diameter, and wherein the internal bore (14) also has a second, conically widening portion (14b) connected to the first cylindrical portion and having a largest diameter and a conically widening portion length, and a third cylindrical portion (14c) which extends from and is connected to the second conically widening portion, the third cylindrical portion (14c) having a diameter which corresponds to the largest diameter of the second conically widening portion, and wherein the longitudinal slots (12) terminate in the conically widening portion (14b) of the internal bore (14).

2. The improvement according to claim 1, wherein the conically widening portion length corresponds at least to the length of the first cylindrical portion (14a) and at most to twice the length of the first cylindrical portion (14a).

3. The improvement according to claim 1, wherein a diameter of the conically widened portion (14b) of the internal bore (14) corresponds approximately to the mean expander cone diameter.

4. The improvement according to claim 1, wherein the threaded bolt (4) has a constriction (15) adjacent the expansible body (6) and the constriction (15) is shaped to fit the contour of the internal bore (14) of the expansible sleeve (11).

5. The improvement according to claim 1, wherein the largest expander cone diameter corresponds approximately to the external diameter of the expansible sleeve (11).

* * * * *